3,740,365
INHIBITION OF DISCOLORATION OF PAINTS CONTAINING DRIERS

Helmut Schuler and Uwe Thies, Goslar, Germany, assignors to Firma Gebr. Borchers AG, Goslar, Germany
No Drawing. Filed Sept. 11, 1970, Ser. No. 71,358
Claims priority, application Germany, Sept. 13, 1969, P 19 46 477.8
Int. Cl. C09d 7/12; C08g 51/54; C08f 45/54
U.S. Cl. 260—22 A          5 Claims

ABSTRACT OF THE DISCLOSURE

Discoloration of paints containing driers is inhibited by the incorporation therein of certain phosphoric acid esters or metal or amine salts thereof. The esters have the generic formula

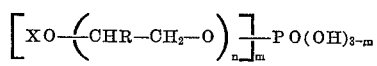

X is an alkyl or acyl radical,
R is hydrogen or an alkyl radical,
$n$ is an integer from 1 to 6, and
$m$ is 1 or 2.

This application has to do with paints containing driers, and with additives which prevent or reduce the discoloration of such paints.

BACKGROUND OF THE INVENTION

Paints which dry oxidatively, and the drying of which is caused by the addition of a heavy metal soap of an organic acid, such as naphthenic acids, linseed oil fatty acids, resin acids, alpha-ethyl hexanoic acid, or other synthetic acids, are subject to discoloration, or yellowing of white paints, transparent coatings or polyester condensates applied to light substrates. The original color hue of white paints is measurably degraded upon the addition thereto of a drier. Depending on the strength of the siccative, various color shades can arise with white paints. This undesirable characteristic of oxidatively drying previously could not be avoided or remedied. Efforts have been made to obtain lightening of colors tending to darken, by specific addition of various color additives to white paints and high temperature paints. To date, satisfactory results have not been obtained by such efforts.

SUMMARY OF THE INVENTION

In accordance with this invention, there are provided paints containing conventional driers and certain phosphoric acid esters, and/or salts thereof, which are free or substantially free of discoloration. The phosphoric acid esters are represented by the general formula

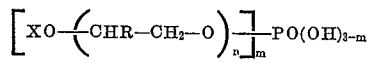

wherein

X is an alkyl or acyl radical,
R is hydrogen or an alkyl radical, particularly methyl,
$n$ is an integer from 1 to 6, and
$m$ is 1 or 2.

SPECIFIC EMBODIMENTS OF THE INVENTION

The phosphoric acid esters of this invention are derived from alkyleneglycolmonoalkylaryl, -alkaryl-ethers or alkyleneglycolmonoesters of mono- or polybasic aliphatic or aromatic acids, The phosphoric acid esters can be represented also by the following general formula:

(I) 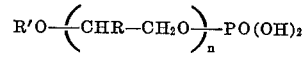

(II) 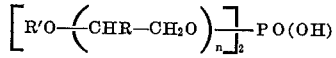

(III) 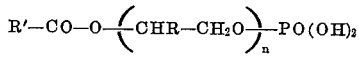

(IV) 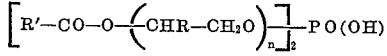

In the above formulas, R' is a hydroxyl portion of mono- or polyethylene or a propylene glycol alkyl-, aryl or alkylaryl group which can be etherized. Together with the carboxyl portion, the R' radical in accordance with Formulas III and IV forms the monovalent esterifying radical of the acid of the alkylene glycol. In both cases, the second-hydroxyl group of the alkyleneglycol is esterified with a phosphorus acid group. The R' radical may, also, be a di- or poly-valent group, for example, in the form of an alkylene group between two or more molecules of the glycol phosphoric acid ester. It appears to be important to obtain the desired effect, that is, to achieve the object of the invention, that phosphoric acid esters of alkylene-glycols are used. As an example of suitable alkylene glycol monoalkyl ethers to form such phosphoric acid esters include, for example, ethylene glycol monomethyl ether, ethylene glycol monoethyl ether, ethylene glycol mono-n-butyl ether, diethylene glycol monomethyl ether, diethylene glycol-n-butyl ether, triethylene glycol monoethyl ether and tetraethylene glycol monoethyl ether.

Examples of suitable alkylene glycol monoaryl ethers include: ethylene glycol monophenyl ether, diethylene glycol monophenyl ether, and triethylene glycol monophenyl ether.

Examples of suitable alkylene glycol monoalkaryl ethers include: ethylene glycol monononylphenyl ether, diethylene glycol monononylphenyl ether, diethylene glycol monodinonylphenyl ether, and triethyleneglycol monononylphenyl ether.

Suitable alkylene glycol monoesters include: ethylene glycol monoacetate, diethylene glycol monoacetate, triethyene glycol monopropionate, diethylene glycol monobenzoate, diethylene glycol monophenyl acetate and diethylene glycol monophthalate.

As evidenced by experimental results, the effect in accordance with the present invention is not limited to the aforementioned phosphoric acid esters.

Metal salts of these phosphoric acid esters have metal components of the type used for conventional driers, namely, cobalt, manganese, lead, calcium, zinc, cerium, vanadium and others. As indicated above, a metal salt can be used instead of or in admixture with a phosphoric acid ester. Such an additive in a white paint lightens the same, particularly after artificial aging, for example 15 hours at 95° C. to such an extent that the whiteness value corresponds to that for the paint free of a drier.

For use in the invention, amine salts of phosphoric acid esters are preferred, in combination with metallic soaps used in general practice, for example metal naphthenates and salts of synthetic acids such as alpha-ethyl hexanoic acid. The same lightening is observed as with use of the metal salts of the phosphoric acid esters. Suitable amines to form the salts with the phosphoric acid esters identified above are, for example, dialkyl (e.g. methyl, ethyl, etc.) cyclohexyl amine, dicyclohexyl amine, cyclohexyl amine, trialkanolamine as triethanolamine and others.

The phosphoric acid esters to be used in accordance with the invention are known in the art. They can be prepared according to known processes by reaction of an alkylene glycol monoalkyl-, aryl- or alkaryl-ether of an alkylene glycol monoester, mono- or poly-basic aliphatic or aromatic acid with phosphorus pentoxide in a molar proportion of 3 to 1, with mixtures of mono- and diesters being formed. The mixtures can be used as well as an individual mono-basic ester or an individual dibasic ester, and neutralized with a suitable amine.

With the addition of a phosphoric acid ester, or salt thereof and particularly an amine salt, in accordance with the present invention, to paints containing driers, discoloration is prevented in all instances. Paints as contemplated herein are covering or coating substances in accordance with German specification DIN 55,945, namely, liquid to pasty, physically or chemically drying substances or mixtures of substances which can be applied by means of brushing, spraying, dipping, floating, or by other means on surfaces and which provide a covering coating. They usually consist of binders, pigments, driers, plasticizers and fillers.

Adding the aforementioned phosphoric acid esters, or salts thereof to paint compositions, that is after addition of the conventional driers, or by addition to pigments to be ground, a noticeable lightening is observed in each instance, which corresponds in whiteness to that of an original coat of a white paint free of a drier. Discoloration of clear lacquers, and coatings, which may arise due to the inherent coloring of various dryers, is reduced. Further, the tendency of white paints to become green due to cobalt is reduced. To obtain optimum lightening, it is desirable to let the base paint age for 72 hours. Paints including high-temperature coatings show no, or only a very small tendency, to yellow after addition of one or more of the phosphorus-containing additives described above. Films of high-temperature paints formed from various materials lightened even when subjected to high temperatures. Further, the so-called "pot life" of reactively drying paints was not influenced. Rusting of steel beneath coatings is reduced by the addition of one or more of the phosphorus-containing additives described above.

The quantities to be used are from about 0.05 to about 3 percent by weight of the total paint compositions. In oxidatively air-drying paints, an amount of from about 0.1 to about 1 percent is recommended. The quantity to be added to high-temperature compositions can vary between about 0.1 and about 3 percent. Polyester condensate compositions with a cobalt or vanadium accelerator requires an amount of between about 0.05 and about 0.1 percent. The "pot life" is not delayed by such a concentration. Upon addition of one or more of said phosphorus-containing additives, it has further been observed that separation of pigments and fillers in the paints is substantially reduced, that the formation of skin is delayed and that the flowability is not inhibited.

The present invention is illustrated by the following examples.

EXAMPLE 1

A white paint comprising the following components was used:

|  | Parts |
|---|---|
| Binder (long oil alkyd based on linseed oil) | 57.5 |
| Titanium dioxide | 35.0 |
| Metal naphthenate mixture (drier) containing Co, Pb and Mn naphthenates; 0.75% Co, 11% Pb, 0.75% Mn | 1.0 |
| Turpentine | 7.0 |

To the above paint was added 1 part of the dimethylcyclohexyl amine salt of diethylene glycol mono-n-butyl ether phosphate corresponding to the general formula given above.

Testing was carried out by examining a paint covering on a glass plate, after drying, with a layer thickness of 35–40 microns, and measuring the white level with an Erichsen whiteness meter. As standards barium sulfate is equal to a 99 percent whiteness value and color tone RAL 1015 is equal to a 0 percent whiteness value.

Test results are given below in Table I.

TABLE I

| Composition: | Percent whiteness |
|---|---|
| (1) Example 1 without drier, not aged | 90 |
| (2) Example 1 with drier, not aged | 76 |
| (3) Example 1 with drier, not aged, and with 1% of the amine salt | 90 |
| (4) Example 1 with drier, aged 15 hours at 95° C. | 53 |
| (5) Example 1 with drier, aged 15 hours at 95° C., with 1% of the amine salt | 84 |

EXAMPLE 2

A polyester coating composition was prepared from:

|  | Parts |
|---|---|
| Polyester resin [1] | 90.5 |
| Cobalt octoate, 6% Co | 0.37 |
| Organic peroxide solution [2] | 9.13 |

[1] An unsaturated polyester resin in styrene.
[2] Active component: cyclohexanone peroxide.

At a reaction time of between 8–10 minutes at 20° C., the composition started to gel and eventually hardened completely. Coatings made by pouring the fluid composition into a glass tube were colored pink-red after hardening.

Upon addition of 0.1 percent of the amine salt identified in Example 1 to the polyester resin mixture, the glass tube samples were substantially lightened.

EXAMPLE 3

A high temperature paint containing maleic resin based on dehydrated castor oil was heated to a temperature of 180° C. for 12 minutes. This was tested as in Example 1. The drier, 1 percent by weight, comprises a mixture of Co, Ba and Zn octoates, containing 1.2% Co, 7.2% Ba and 3.2% Zn. Test results are shown in Table II below.

TABLE II

| Composition: | Percent whiteness |
|---|---|
| (1) Example 3 without drier | 90 |
| (2) Example 3 with 1% drier | 75 |
| (3) Example 3 with 1% drier and with 0.5% of the amine salt of Example 1 | 85 |
| (4) Example 3 with 1% drier and with 1% of the amine salt of Example 1 | 90 |

EXAMPLE 4

A high temperature paint containing maleic resin based on dehydrated castor oil, was heated at a temperature of 180° C. for 12 minutes, and a drier, 1% by weight, was incorporated therein. The drier had the same composition as the drier of Example 3. The paint was tested as in Example 1, with and without 1% of the dimethylcyclohexyl amine salt of ethylene glycol monoacetate phosphate corresponding to the general Formulae III and IV. Results are set forth in Table III below.

TABLE III

| Composition: | Percent whiteness |
|---|---|
| (1) Example 4 without drier | 90 |
| (2) Example 4 with 1% drier | 75 |
| (3) Example 4 with 1% drier and with 0.5% of said monoacetate phosphate | 84 |
| (4) Example 4 with 1% drier and with 1% of said monoacetate phosphate | 90 |

We claim:
1. In a paint composition containing a polyester resin and a cobalt, manganese, lead, calcium, zinc, cerium or vanadium metal soap drier, the improvement which comprises
from about 0.05 to about 3 percent by weight of a compound selected from the group consisting of a phosphoric acid ester having the following general formula

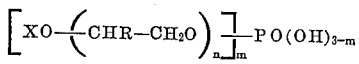

wherein
- X is an alkyl or acyl radical
- R is a hydrogen or an alkyl radical,
- $n$ is an integer from 1 to 6, and
- $m$ is 1 or 2, a cobalt, manganese, lead, calcium, zinc, cerium or vanadium metal salt of said ester, and an alkyl, cycloalkyl or alkanol amine salt of said ester.

2. A composition of claim 1 wherein the resin is an alkyd resin.

3. A composition of claim 1, wherein the salt is the dimethylcyclohexyl amine salt of diethylene glycol mono-n-butyl ether phosphate.

4. A composition of claim 1, wherein the salt is the dimethylcyclohexyl amine salt of ethylene glycol mono-acetate phosphate.

5. A paint composition of claim 1, wherein the drier comprises a cobalt naphthenate.

References Cited

UNITED STATES PATENTS

| | | | |
|---|---|---|---|
| 3,547,849 | 12/1970 | Kennedy | 260—29.6 NR X |
| 3,423,346 | 1/1969 | Klauss et al. | 260—29.6 NR X |
| 3,470,222 | 9/1969 | Jennings | 260—950 X |
| 3,462,520 | 8/1969 | Nehmsmann et al. | 260—950 |
| 2,853,471 | 9/1958 | Beadell | 260—924 X |
| 2,173,638 | 9/1939 | Rozenbroek | 260—952 X |
| 3,422,166 | 1/1969 | Davis | 260—950 X |
| 3,489,722 | 1/1970 | Kotani et al. | 260—45.7 P X |
| 3,347,818 | 10/1967 | Howe | 260—45.7 P X |

ROBERT F. WHITE, Primary Examiner

J. B. LOWE, Assistant Examiner

U.S. Cl. X.R.

106—15 FP; 260—45.7 P